April 14, 1931.  F. E. HASKELL  1,800,999
AMMETER
Filed Feb. 15, 1926

Frank E. Haskell Inventor

Patented Apr. 14, 1931

1,800,999

UNITED STATES PATENT OFFICE

FRANK E. HASKELL, OF HOLYOKE, MASSACHUSETTS

AMMETER

Application filed February 15, 1926. Serial No. 88,506.

Ammeters, as usually constructed, are very delicate and liable to injury from excessive current whenever such current is accidentally passed through them. The moving element particularly is very light and it is common to have the indicating needle bent and distorted from a heavy overload. Even though there is no serious injury to the parts, when the accuracy is materially reduced, the ammeter's usefulness as a measuring instrument is gone until it can be readjusted and recalibrated. This generally means returning the ammeter to the factory, so that even a slight injury to the moving element is very nearly as costly in both delay and expense as when the physical extent of the injury is much greater.

My invention prevents the above injuries by a suitable combination of circuits so that the current which acts on the moving element is limited to a value approximately equal to the full scale value of the current. The force acting on the moving element is therefore never very much in excess of that required to produce full scale deflection even under the most aggravated conditions of short circuit.

For a more detailed explanation of my invention reference is made to the accompanying drawings which show several embodiments of my invention to fit various conditions as will be hereinafter more fully set forth. While these drawings illustrate the best methods now known to me of carrying out my invention, nevertheless I wish it understood that they are illustrations merely and do not limit the scope of my invention further than it is lmited in the claims annexed hereto.

Figure 1:
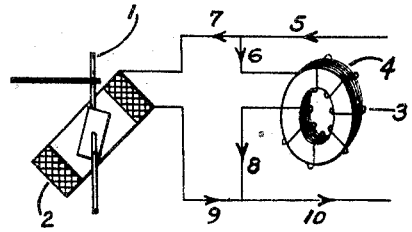
Figure 2:
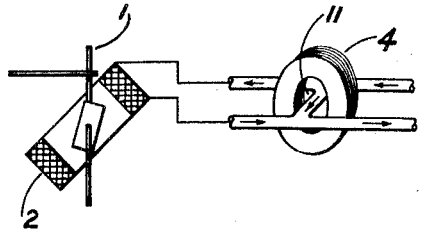
Figure 3:
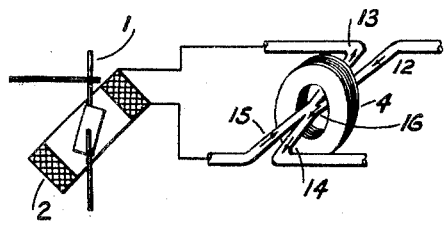
Figure 4:
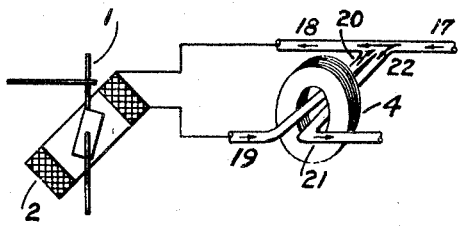
Figure 5:
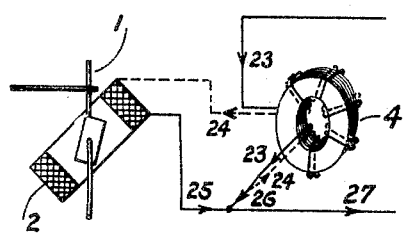
Figure 6:
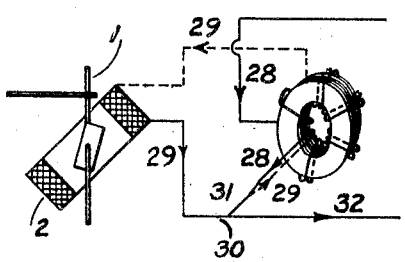
Figure 7:
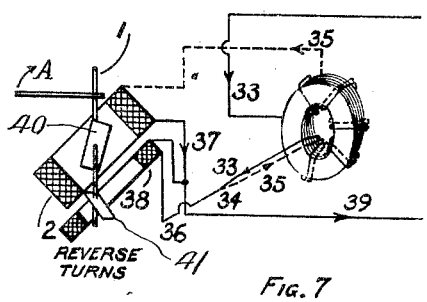

Fig. 1 shows an embodiment of my invention in one of its simplest forms; Fig. 2 differs from Fig. 1 in that the reactance has only one turn; Fig. 3 shows a modification that more effectually carries out the purpose of the invention; Fig. 4 is a variation of Fig. 3; Fig. 5 illustrates the principle shown in Fig. 4 as embodied in a reactance with more than one turn; Fig. 6 is an arrangement that compensates for inaccuracies introduced by the invention; and Fig. 7 is a modification that embodies still other corrective factors and is therefore a still greater refinement.

In Fig. 1, 1 represents the moving element of an alternating current ammeter or in more general terms the indicating mechanism of such an instrument. 2 is the coil which operates on the indicating mechanism and causes a deflection. 3 is a coil wound upon a core 4 of iron or other magnetic material designed to become saturated when the current to be measured increases beyond the full scale value of the instrument. Coils 2 and 3 are connected in parallel or shunt as shown. The current to be measured flows through the conductor 5 as indicated by the arrow and then divides. Most of the current flows through conductor 7, coil 2, conductor 9 and back to the point where the other circuit is connected. A small portion of the current flows through conductor 6, coil 3, conductor 8, and after combining with the current from conductor 9, the total current passes through conductor 10.

The operation is as follows. For normal readings a certain small percentage of the current passes through coil 3. If the current through coil 2 is increased, say doubled, the voltage drop across the coil is doubled. Likewise the current through coil 3 is doubled, the flux through the core 4 is doubled and the reactance drop across coil 3 at a given frequency is also doubled. When, however, the current through coil 2 reaches full scale value core 4 becomes saturated and no matter how much current then flows through coil 3 the flux in core 4 will increase only a small amount, the reactance drop across coil 3 will increase only a moderate amount and therefore the current through coil 2 will increase, with this same voltage drop, only a moderate amount. In other words the reactive coil acts like a safety valve permitting only a relatively small amount of current to flow through it below a certain potential difference common to both coils and permitting the current to flow relatively very freely when this potential difference common to both coils rises above a certain value.

It should be clearly understood that the voltage across the reactance coil may increase even though the flux in the core has reached a maximum. This is due to wave-form distortion of the voltage curve. But in any event this increase in voltage will be much less than it would be if the core were not saturated.

When an instrument is constructed as shown in Fig. 1, if the iron core 4 is made of ordinary electrical sheets and so designed that the current through coil 3 is only a fraction of the total current it will be found that the core will be very small, not more than an inch overall dimensions. It is almost impossible to wind such a core with a low resistance winding. The result of this is that if the resistance of coil 3 is as high as one-half or one-third of the resistance of coil 2, then the current through coil 2 will never be less than one-half or one-third of the current through coil 3. That is, to permit the excess current to flow readily through coil 3, the resistance of coil 3 must be kept low as compared with coil 2. This is very difficult of attainment with the characteristics of ordinary electrical steel, combined with the fact that the current coil of an ammeter is of a low resistance itself, and also the size of the core is very small on which winding 3 must be placed.

Fig. 2 illustrates an ammeter for heavy currents wherein the relative value of the resistance of the shunt coil is greatly reduced. The conductor 11 is carried through the core 4 just once and constitutes what is known as a one-turn coil. This greatly reduced relative resistance is the result of two factors. First, in coil 3 there is a great deal of waste space, either air or insulation which is not occupied by active copper, while in Fig. 2 it is possible to obtain a cross-section of conductor practically equal to the opening in the iron and therefore of correspondingly low resistance. Secondly, each turn of coil 3 has a length equal to four sides of core 4 while the length of 11 may be no longer than one side. I, therefore, prefer Fig. 2 whenever the current is large enough to make it suitable, possibly with the additional modification described in the next paragraph.

Fig. 3 represents an effort to still further reduce the resistance of the circuit in shunt with coil 2. This has been done by slitting the conductor 11 of Fig. 2 from both sides. All the current passes through 12 and at the center of the coil divides. Enough to magnetize the core passes through the short path 16 but most of the current passes through 13, coil 2, conductor 15 and after uniting with the current flowing through 16, the entire current passes through 14. The current through 13 first flows through 12, in addition to the current of 16, but in an opposite direction so that its magnetizing effect is zero just as in Fig. 2 where the current of coil 2 does not flow through conductor 11 at all. Likewise the current in 15 has its magnetizing effect neutralized by its own flow in a reverse direction in conductor 14. The current through 16 has no neutralization as it flows through 12, 16 and 14 and is the current which produces the magnetization in the core 4. From the alternating current and reactance standpoint Fig. 3 is the exact equivalent of Fig. 2. If the reactance coils of Figs. 1 and 2 are in shunt with the current coil 2, then the reactance coil of Fig. 3 is in effective shunt with the current coil 2 since it gives the same effect. When, however, the core 4 becomes saturated and there is no additional reactive effect, then the additional current will divide much as direct current would, practically all of it flowing through 16 causing a small potential drop and consequently forcing a small portion of the current through the parallel circuit 13, 2 and 15. It will be obvious to those skilled in the art that if the slitting of what is the equivalent of the conductor 11 in Fig. 2 is carried far enough it will practically eliminate the effect of the resistance of the path 16 in its tendency to force any considerable portion of the current through coil 2.

Fig. 4 illustrates a modification where what is the equivalent of the conductor 11 in Fig. 2 is slit from one side only and provides the two portions 19 and 21. This may be preferable for mechanical reasons but in its operation it is identical with Fig. 3, that is, it makes no difference whether the short path 16 or 22 is inside the core or not.

The path 22 is the short distance the current not passing through the ammeter traverses in leaving path 17—18 before it reaches the path of current 19—20—21. The operation of Fig. 4 is as follows. All of the current flows as indicated at 17. At normal values most of it then flows through 18, 2, 19, and 20. A small amount, sufficient to magnetize the core 4, flows through the short path 22 and then both currents continue and flow through 21. The current flowing through 19 also flows through 21 but in a reverse direction and therefore its magnetizing effect on the core is zero. The current in 22, however, flows through 21 unneutralized and is the current which magnetizes the core. From the alternating current standpoint Fig. 4 is the exact equivalent of Fig. 2, the currents in 11 and 22 being the same, and the reactance coil of Fig. 4 may therefore be said to be in effective shunt with the coil 2. But on direct current or when the core 4 has become saturated the path 22 is so much shorter than 11 in Fig. 2 that the proportion of current flowing through it instead of coil 2 will be much higher than in Fig. 2. Figs. 3 and 4 are therefore simply Fig. 2 with special means for reducing the effective resistance of the path in shunt with coil 2. In speaking of the reactance which is in effective shunt it is necessary to include all that part of 11 or its equivalent that is cut by the magnetic flux. But when speaking of the resistance which is in effective shunt, only that part of 11 is included which would provide a shunt path for direct current such as 16 or 22.

Fig. 5 illustrates the adaptation of the resistance reducing means to a reactance coil of more than one turn. The total current flows through 23 and then divides, the larger portion under normal operation returning through 24, coil 2, conductor 25 and then uniting with the smaller portion flowing through 26 and all the current passing on through 27. All of the current flowing through 24 first flows through 23 but in a reverse direction and therefore has no effect in magnetizing the core. The current through 26, however, flows through all the windings 23 unneutralized by any equivalent current in 24 and is therefore the current which magnetizes the core. From the alternating current standpoint Fig. 5 is the equivalent of Fig. 1 and the reactance coil of Fig. 5 may therefore be said to be in effective shunt with the coil 2. On direct current or alternating current when the core has become saturated, however, the effective resistance of the path in shunt with the coil 2 is much reduced being only the length 26 which can obviously be made very short instead of the path 6, 3, 8 of Fig. 1.

As already stated, the problem of keeping the resistance to a low value is a difficult one. The volt-amperes required by the ammeter are ordinarily low. For readings below full scale deflection it is desirable that the reactance should have a total volt-ampere consumption much less, perhaps one-tenth of the volt-amperes necessary to operate the ammeter. These volt-amperes determine the size of the magnetic core which consequently is very small. It is so small that only small sized wire can be used and give the requisite number of turns; so that the number of turns multiplied by the mean resistance per turn gives a total resistance sufficiently high to divert a large portion of the overload current through the ammeter even after the iron core has become saturated. But while the total resistance of the coil as determined by the product of the number of turns multiplied by the mean resistance per turn may still remain high the foregoing arrangements permit the resistance in effective shunt with the ammeter to be greatly reduced.

In each modification described thus far the coil 2 carries a current somewhat less than the total current to be measured. That is, if the instrument were correctly calibrated with the reactance coil connected and then the reactance coil for any reason were disconnected the instrument would read too high. There are many reasons why it would be desirable to have the coil 2 receive the same current with the reactance connected as without. For example, when used as a portable instrument, if it were desired to measure direct current it would be necessary to disconnect the reactance coil and in all the modifications described thus far even on alternating current it would be necessary to correct for the higher reading or have a separate scale on the instrument for such use. Also this reactance coil introduces certain errors not present without it and if it were known that there was no danger of a short-circuit or overload it might be desirable to disconnect the reactance and obtain a more accurate reading. Contrawise a very accurate high-grade instrument might be used occasionally where there was some likelihood of injury from a sudden excessive load. In such a case it would be desirable to connect the reactance for protection but under other circumstances it would be disconnected in order to obtain the high accuracy of which the instrument was capable. Also my invention could be built as an attachment to be used with ammeters already constructed and in such cases it would be desirable that the current coil have the same current either with or without the reactance coil connected. The modification described in the next paragraph is particularly adapted to such use.

Fig. 6 shows a further modification of Fig. 5 which compensates for the current required to magnetize the core 4 so that the current in coil 2 is the same as that in the line. All the current flows through 28 which as shown consists of 6 turns and then unlike Fig. 5 practically none of it flows through 31 but it all returns through 29 and to the coil 2, conductors 30 and 32. But 29 has five turns instead of six and therefore coil 28 produces more magnetizing effect than coil 29 which has the same current but only five turns. Thus the difference between Figs. 5 and 6 is that in Fig. 5 the turns are the same but magnetization is produced because of higher current in 23 than 24 while in Fig. 6 the current is the same in 28 and 29 but the magnetization is produced by virtue of the greater turns in coil 28 than in coil 29. By this means it is possible to use the same scale with practically no error either with or without the reactance coil.

In none of the modifications thus far described is the current in the ammeter coil absolutely limited. This is partly because in ordinary iron the flux still increases somewhat after the knee of the saturation curve is passed. But even if the flux did not increase and the curve became parallel to the X axis still the effective voltage due to the changing flux would continue to increase somewhat and likewise the effective current in the ammeter coil. This is because the flux produces a distorted wave form voltage curve. This increase is even greater than the increase due to the flux not being absolutely limited.

I propose to correct for this by using an auxiliary coil in the ammeter opposing the action of the main coil and carrying a current which as compared with the current in the main coil is proportionately greater as the main line current becomes greater. Thus, referring to Fig. 1, the auxiliary coil could carry the current of either 5 or 8. I prefer to connect it in conductor 8 as this makes the ratio of overload current to normal current in the auxiliary coil the greatest.

Fig. 7 shows diagrammatically such an auxiliary coil ammeter as used with the modification of Fig. 6. All of the current flows through 33 which like Fig. 6 consists of six turns. From junction 34 practically all of the current, at normal loads, returns through 35 and then passes through the main coil 2 and conductor 37. Above a certain value most of the excess current passes through conductor 36, auxiliary coil 38, and joining with the current in 37, the total current passes through the conductor 39. The shaft of the indicating mechanism is provided with a magnetic vane 40 upon which the coil 2 acts with a tendency to move the indicating needle in the direction indicated by the arrow A. A second magnetic vane 41 is also provided upon the same shaft and in such a position with relation to the coil 38 that the tendency of the coil 38 is to turn the indicating needle in the opposite direction from that indicated by the arrow A. While these coils and vanes are shown positioned close together in the figure it is to be understood that in actual construction it would be desirable to have them spaced sufficiently from each other so that neither coil would have an appreciable effect on the vane of the other coil. Coil 38 is wound with only a few turns as compared with the turns of coil 2. Under normal loads there is practically no current through 38 and its effect is therefore nil. But the overload excess current nearly all flows through the auxiliary coil. The increase which passes through 2 is due to wave-form distortion and is much the smaller portion. It is therefore possible to have the torque produced by the auxiliary coil 38 with fewer turns and the greater portion of the excess current fully counteract the torque produced by the greater turns but small portion of excess current in the main coil 2. Or if it is not necessary for it to fully counteract the torque due to the excess current of the main coil 2, the number of turns in the auxiliary coil 38 may be made just large enough to counteract the excess torque of coil 2 sufficiently for practical purposes.

Another characteristic of certain types of ammeters, such as the Thomson inclined coil ammeter shown in all the drawings, lends itself well to the corrective purpose of the auxiliary coil. The nearer the needle of the main coil 2 approaches the coaxial position the less is the turning force on the shaft a given flux produces. The arrangement of the auxiliary coil 38 and its vane 41 as shown in Fig. 7 gives the opposite effect; that is, the needle 41 at low currents in the main coil is nearly coaxial with little effect and at heavy overloads nearly at right angles with maximum effect.

The construction of Fig. 7 may be somewhat simplified by omitting the second magnetic vane 41 and having both coils act on the same magnetic vane 40. In this case the coil 38 would be so connected that the magnetizing effect of the current flowing through it would be in an opposite direction from that due to the current flowing in coil 2. As the currents in 35 and 36, that is in coils 2 and 38, are not exactly in phase or phase opposition it would not be possible to obtain the same degree of exact neutralization as with two vanes but the actual construction would be simpler and the neutralization would be satisfactory in some cases.

It is clear that whenever an instrument is unusually delicate and liable to injury, or where the overloads are very heavy and very common it is possible to absolutely eliminate any such thing as overload injuries. The modification of Fig. 7 is somewhat more expensive than the others and it is because of this extra expense that the others would often be deemed sufficient for all practical purposes.

While I have described several adaptations of my invention in considerable detail I do not wish to confine myself to any specific form or forms but desire to secure within the scope of my claims all modifications covered thereby.

I claim:

1. In an alternating current ammeter, an indicating mechanism, a current coil for operating said indicating mechanism, a reactance coil connected in effective shunt with said current coil, said reactance coil having a core designed to become saturated when the ammeter is reading near full scale deflection, and means for compensating for the error caused by some of the current being required to magnetize the reactance core.

2. A protective device for an alternating current ammeter comprising a reactance coil adapted to be connected in effective shunt with said ammeter, said reactance coil having a core designed to become saturated when the ammeter is reading near full scale deflection, and means for compensating for the error caused by some of the current being required to magnetize the reactance core.

3. In an alternating current ammeter, an indicating mechanism, a main current coil for operating said indicating mechanism, an auxiliary current coil opposing the action of said main coil, means for decreasing the effect of said main coil above full scale deflection, said means at the same time increasing the effect of said auxiliary coil above full scale deflection.

4. In an alternating current ammeter, an indicating mechanism, a main current coil for operating said indicating mechanism, an auxiliary coil for opposing the action of said main coil, a reactance coil associated with said coils having a core designed to become saturated at full scale current and so connected that the excess current required to magnetize the core above saturation is utilized to reduce the current in the main coil and to increase the current in the auxiliary coil.

5. In an alternating current ammeter, an indicating mechanism, a main current coil for operating said indicating mechanism, an auxiliary current coil opposing the action of said main coil, a reactance coil having a core designed to become saturated at full scale current, said reactance coil being connected in effective shunt with said main coil and in series with said auxiliary coil.

6. A protective device for an alternating current ammeter, comprising a miniature current transformer so designed that below full scale current the core of the transformer will be unsaturated and whose ratio is such that the error due to the magnetizing current of the primary is corrected and the ammeter receives the exact line current and above full scale deflection the core is saturated whereby the secondary carries much less current than the primary.

7. In an alternating current ammeter, an indicating mechanism, a current coil for operating said indicating mechanism, and a reactance coil connected in effective shunt with said current coil and having a core adapted to become saturated when the current in the ammeter reaching approximately full scale value, the reactance coil being so constructed that the resistance in effective shunt with the ammeter coil is much less than the product of the number of turns and the mean resistance per turn.

8. In an alternating current ammeter, an indicating mechanism, a current coil for operating said indicating mechanism, a reactance coil connected in effective shunt with said current coil and having a core adapted to become saturated when the current in the ammeter reaches approximately full scale value, the reactance coil being so constructed that the resistance in effective shunt with the ammeter coil is much less than the product of the number of turns and the mean resistance per turn, and means for compensating for the error caused by some of the current being required to magnetize the reactance core.

9. A protective device for an alternating current ammeter comprising a reactance coil adapted to be connected in effective shunt with said ammeter and having a core adapted to become saturated when the current in the ammeter is reading near full scale deflection, the reactance coil being so constructed that the resistance in effective shunt with the ammeter coil is much less than the product of the number of turns and the mean resistance per turn.

10. A protective device for an alternating current ammeter comprising a reactance coil adapted to be connected in effective shunt with said ammeter and having a core adapted to become saturated when the current in the ammeter is reading near full scale deflection, the reactance coil being so constructed that the resistance in effective shunt with the ammeter coil is much less than the product of the number of turns and the mean resistance per turn, and means for compensating for the error caused by some of the current being required to magnetize the reactance core.

11. In an alternating current ammeter, an indicating mechanism, a current coil for operating said indicating mechanism, and a reactance coil connected in effective shunt with said current coil and having a core adapted to become saturated when the current in the ammeter reaches approximately full scale value, the winding of said reactance coil being split throughout the greater part of its length.

12. In an alternating current ammeter, an indicating mechanism, a current coil for operating said indicating mechanism, a reactance coil connected in effective shunt with said current coil and having a core adapted to become saturated when the current in the ammeter reaches approximately full scale value, the winding of said reactance coil being split throughout the greater part of its length, and means for compensating for the error caused by some of the current being required to magnetize the reactance core.

13. A protective device for an alternating current ammeter comprising a reactance coil adapted to be connected in effective shunt with said ammeter and having a core adapted to become saturated when the current in the ammeter is reading near full scale deflection, the winding of said reactance coil being split throughout the greater part of its length.

14. A protective device for an alternating current ammeter comprising a reactance coil adapted to be connected in effective shunt with said ammeter and having a core adapted to become saturated when the current in the ammeter is reading near full scale deflection, the winding of said reactance coil being split throughout the greater part of its length, and means for compensating for the error caused by some of the current being required to magnetize the reactance core.

15. In an alternating current ammeter, an indicating mechanism, a main current coil for operating said indicating mechanism, and an auxiliary current coil opposing the action of said main coil, the coils being so arranged that the torque per ampere produced by the main coil is progressively less as the indicating mechanism moves from positions of lower current values to positions of higher current values and the torque per ampere produced by the auxiliary coil is progressively greater as the indicating mechanism moves from positions of lower current values to positions of higher current values.

In testimony whereof I affix my signature.

FRANK E. HASKELL.